United States Patent
Suzuki et al.

(10) Patent No.: US 10,069,164 B2
(45) Date of Patent: Sep. 4, 2018

(54) ELECTROLYTIC SOLUTION AND BATTERY

(71) Applicant: Panasonic Intellectual Property Management Co., Ltd., Osaka (JP)

(72) Inventors: Hirotetsu Suzuki, Osaka (JP); Nobuhiko Hojo, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 197 days.

(21) Appl. No.: 15/158,592

(22) Filed: May 19, 2016

(65) Prior Publication Data

US 2016/0351958 A1 Dec. 1, 2016

(30) Foreign Application Priority Data

May 25, 2015 (JP) .................................. 2015-105062

(51) Int. Cl.

| | |
|---|---|
| *H01M 10/05* | (2010.01) |
| *H01M 10/0565* | (2010.01) |
| *H01M 10/0525* | (2010.01) |
| *H01M 10/0568* | (2010.01) |
| *H01M 10/0569* | (2010.01) |

(52) U.S. Cl.
CPC ... *H01M 10/0565* (2013.01); *H01M 10/0525* (2013.01); *H01M 10/0568* (2013.01); *H01M 10/0569* (2013.01); *H01M 2300/0034* (2013.01); *H01M 2300/0037* (2013.01)

(58) Field of Classification Search
None
See application file for complete search history.

(56) References Cited

FOREIGN PATENT DOCUMENTS

| JP | 2006-269374 | 10/2006 |
|---|---|---|
| JP | 2006269374 A | * 10/2006 |

* cited by examiner

*Primary Examiner* — Scott J. Chmielecki
(74) *Attorney, Agent, or Firm* — McDermott Will & Emery LLP

(57) ABSTRACT

Provided is an electrolytic solution including a nonaqueous solvent and an alkali metal salt. The alkali metal salt is dissolved in the nonaqueous solvent. The nonaqueous solvent contains a perfluoropolyether. The molecular ends of the perfluoropolyether are each an unsubstituted alkyl ether or an unsubstituted carboxylate. The perfluoropolyether has a repeating unit composed of a perfluoroalkyl chain and an oxygen atom. Also provided is a battery including the electrolytic solution, a positive electrode containing a positive electrode active material that can occlude and release an alkali metal cation, and a negative electrode containing a negative electrode active material that can occlude and release the alkali metal cation.

15 Claims, 1 Drawing Sheet

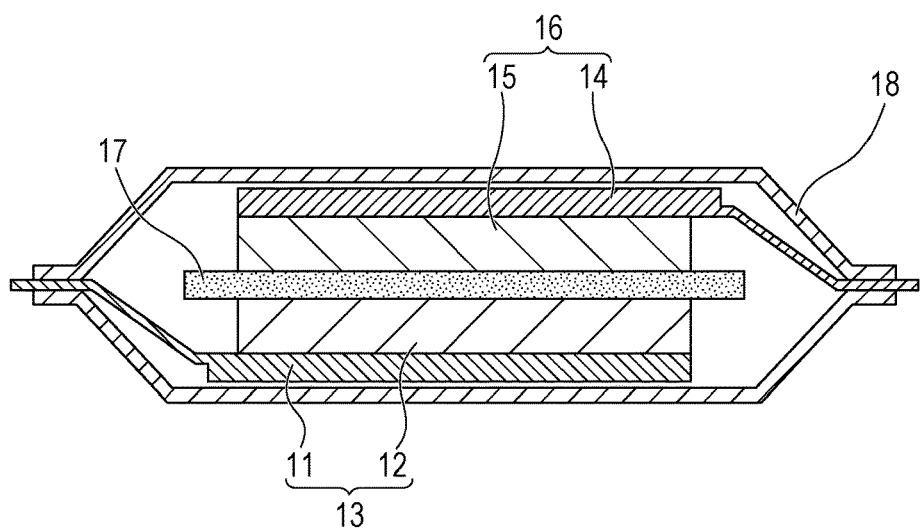

ELECTROLYTIC SOLUTION AND BATTERY

BACKGROUND

1. Technical Field

The present disclosure relates to an electrolytic solution for batteries and a battery including the electrolytic solution.

2. Description of the Related Art

Japanese Unexamined Patent Application Publication No. 2006-269374 discloses a lithium ion battery including an electrolytic solution containing a room temperature molten salt electrolyte comprising a perfluoropolyether.

In the electrolytic solution disclosed in Japanese Unexamined Patent Application Publication No. 2006-269374, the perfluoropolyether is added to the room temperature molten salt electrolyte in a proportion of 0.2% or more and 5% or less.

SUMMARY

One non-limiting and exemplary embodiment provides an electrolytic solution having higher safety, which has been demanded in known techniques.

In one general aspect, the techniques disclosed here feature an electrolytic solution containing a nonaqueous solvent and an alkali metal salt. The alkali metal salt is dissolved in the nonaqueous solvent. The nonaqueous solvent contains a perfluoropolyether. The molecular ends of the perfluoropolyether are each an unsubstituted alkyl ether or an unsubstituted carboxylate. The perfluoropolyether includes a repeating unit composed of a perfluoroalkyl chain and an oxygen atom. In one general aspect, the techniques disclosed here feature a battery including the above-mentioned electrolytic solution, a positive electrode containing a positive electrode active material that has a property of occluding and releasing an alkali metal cation, and a negative electrode containing a negative electrode active material that has a property of occluding and releasing the alkali metal cation.

The present disclosure can achieve an electrolytic solution having high safety.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGURE is a schematic cross-sectional view illustrating an example of the battery according to Embodiment 2.

DETAILED DESCRIPTION

Embodiments of the present disclosure will now be described.

The viewpoints of the present inventor are described below.

Perfluoropolyethers and molecules having a perfluoropolyether skeleton have low compatibility to nonaqueous electrolytic solutions. Therefore, the amount of a perfluoropolyether or a molecule having a perfluoropolyether skeleton that can be added to a nonaqueous electrolytic solution is disadvantageously restricted to a narrow range.

For example, in Japanese Unexamined Patent Application Publication No. 2006-269374, the amount of the perfluoropolyether is limited to 5% or less.

Thus, if a perfluoropolyether is added to a nonaqueous electrolytic solution in an amount higher than a certain proportion (e.g., 5% or more), the perfluoropolyether cannot be uniformly mixed with the nonaqueous electrolytic solution, and the performance as an electrolytic solution cannot be shown.

On the basis of the above-mentioned viewpoints, the present inventor has arrived at the creation of the composition of the present disclosure.

Embodiment 1

The electrolytic solution in Embodiment 1 contains a nonaqueous solvent and an alkali metal salt.

The alkali metal salt is composed of an alkali metal cation and an anion.

The alkali metal salt is dissolved in the nonaqueous solvent.

The nonaqueous solvent contains a perfluoropolyether.

The molecular ends of the perfluoropolyether are each an unsubstituted alkyl ether or an unsubstituted carboxylate.

The perfluoropolyether includes a repeating unit composed of a perfluoroalkyl chain and an oxygen atom.

In the composition described above, the nonaqueous solvent is prevented from phase separation, even if the electrolytic solution contains an alkali metal salt. Accordingly, a perfluoropolyether can be mixed with a nonaqueous solvent at an arbitrary ratio and at a higher ratio. That is, a large amount of a perfluoropolyether can be uniformly mixed with a nonaqueous solvent. Consequently, for example, the electrolytic solution can have high flame retardancy, while keeping the function as an electrolytic solution. Thus, a nonaqueous electrolytic solution having higher safety can be achieved.

The perfluoropolyether is a flame retardant solvent and has a low polarity caused by the smallness in the fluctuation of electrons due to the large electronegativity of fluorine atoms. Consequently, the perfluoropolyether has low dissolving properties for salts and therefore cannot dissolve a large amount of a salt, unlike the solvents that are used in known nonaqueous electrolytic solutions.

The smallness of the polarity also causes low compatibility with usual organic solvents having high polarity. In other words, the low polarity prevents the perfluoropolyether from penetrating between the molecules of an organic solvent having a high polarity and large intermolecular forces. Consequently, the perfluoropolyether cannot be mixed with an organic solvent.

That is, in the viewpoint of the internal energy of a material, the internal energy form in the phase separated state is more stable than that in the uniformly compatibilized state.

As in stabilization of a polar organic solvent by the intermolecular forces derived from the polarity, the perfluoropolyether stabilizes the energy through the high affinity between fluorine atoms or intermolecular forces increasing with the molecular chain length.

The use of the perfluoropolyether of Embodiment 1 can create interaction with an organic solvent having a high polarity. The interaction can enhance the influence on energy stabilization by uniform compatibility.

The perfluoropolyether in the electrolytic solution of Embodiment 1 may be a compound represented by Formula (3): R—O—$(C_\alpha F_{2\alpha}$—O—$)_p$—$(C_\beta F_{2\beta}$—O—$)_q$—R, where, Rs each independently represent a carboxylate represented by $CF_2$—COO—$C_xH_{2x+1}$ or an alkyl ether represented by $CH_2$—O—$C_xH_{2x+1}$; α and β each independently represent an integer of 1 to 3; and p and q represent the numbers of repeating units and each independently represent an integer of 1 to 20.

Each R may represent a carboxylate represented by $CF_2$—COO—$C_xH_{2x+1}$. In such a case, x may be 2. That is, each R may be a carboxylic acid ethyl ester.

The composition described above more notably shows an effect of creating interaction with the above-mentioned organic solvent.

When each R represents a carboxylic acid ethyl ester, a may be 3, and may be 1.

Each R may represent an alkyl ether represented by $CH_2$—O—$C_xH_{2x+1}$. In such a case, x may be 1. That is, each R may be a methyl ether.

The composition described above more notably shows an effect of creating interaction with the above-mentioned organic solvent.

When each R represents a methyl ether, a may be 3, and β may be 1.

As described above, modification of each molecular end of the perfluoropolyether with an unsubstituted alkyl ether or an unsubstituted carboxylate can improve the compatibility with polar solvents. Accordingly, the repeating unit of the perfluoropolyether can be constituted, for example, without containing hydrogen. Consequently, both high flame retardancy and compatibility with a polar solvent can be achieved.

The repeating units, $(C_\alpha F_{2x}$—O—$)_p$ and $(C_\beta F_{2\beta}$—O—$)_q$, may each have a straight chain or branched structure.

Examples of the straight chain structure include ($CF_2$—O—), ($CF_2CF_2$—O—), and ($CF_2CF_2CF_2$—O—).

Examples of the branched structure include ($CF(CF_3)CF_2$—O—), ($CF_2CF(CF_3)$—O—), and ($C(CF_3)_2$—O—).

Examples of the combination of the repeating units, —$(C_\alpha F_{2\alpha}$—O—$)_p$—$(C_\beta F_{2\beta}$—O—$)_q$, in Formula (3) include combinations of straight chain structures, such as —$(CF_2CF_2CF_2$—O—$)_p$—$(CF_2$—O—$)_q$—, —$(CF_2CF_2$—O—$)_p$—$(CF_2$—O—$)_q$—, and —$(CF_2CF_2CF_2$—O—$)_p$—$(CF_2CF_2$—O—$)_q$—.

Alternatively, the combination of the repeating units may be a combination of a straight chain structure and a branched structure, such as —$(CF(CF_3)CF_2$—O—$)_p$—$(CF_2CF_2$—O—$)_q$— and —$(CF_2CF(CF_3)$—O—$)_p$—$(CF_2CF_2$—O—$)_q$—.

Furthermore, the combination of the repeating units may be a combination of branched structures, such as —$(CF_2CF(CF_3)$—O—$)_p$—$(CF(CF_3)CF_2$—O—$)_q$— and —$(C(CF_3)_2$—O—$)_p$—$(CF(CF_3)CF_2$—O—$)_q$—.

In a combination of two or more types of repeating units, the perfluoropolyether may be a block copolymer or may be a random copolymer.

The nonaqueous electrolytic solution of Embodiment 1 is used in, for example, a lithium secondary battery. Accordingly, the boiling point of the perfluoropolyether is preferably 60° C. or more, from the viewpoint of the general operation temperature of lithium secondary batteries. That is, in order to achieve such a boiling point, the perfluoropolyether preferably has a weight-average molecular weight of about 350 or more.

An increase in the weight-average molecular weight causes an increase in the viscosity. From the viewpoint of an increase in the intermolecular forces, the weight-average molecular weight is preferably also less than 1500.

Accordingly, the numbers, "p" and "q", of the repeating units and the numbers "α" and "β" of the carbon atoms in the perfluoroalkyl chains of the perfluoropolyether solvent represented by Formula (3) are preferably selected such that the compound has a weight-average molecular weight of about 350 or more and less than 1500. For example, the subscripts "p" and "q" are preferably each an integer of 1 to 20; and the subscripts "α" and "β" are preferably each an integer of 1 to 3.

The perfluoropolyether may be a single compound or may be a mixture of two or more of different compounds.

The perfluoropolyether has a molecular weight distribution. Accordingly, the numbers "p" and "q" of actually measured repeating units are not necessarily integers.

Herein, the weight-average molecular weight (Mw) is determined by multiplying the weight of each molecule by the molecular weight of the molecule, summing the resulting products, and dividing the resulting sum by the total weight.

Experimentally, the weight-average molecular weight can be determined by gel permeation chromatography (GPC) measurement. The GPC is one type of liquid chromatography for performing separation based on the difference in molecular size and is a method for measuring the molecular weight distribution and average molecular weight distribution of a high molecular weight material. In addition, use of a light scattering detector in the GPC can provide absolute molecular weight distribution and weight-average molecular weight of a polymer material and also information, such as the radius of rotation.

The perfluoropolyether can be synthesized by a known reaction, such as photooxidation of a perfluoroolefin or anionic polymerization of the epoxide of a perfluoroalkane. In the product synthesized by such a reaction, the degree of polymerization (i.e., the molecular weight of the product) varies depending on the degree of the reaction progress. A desired molecular weight of the product can be obtained by precision distillation or column purification.

In the electrolytic solution of Embodiment 1, the volume proportion of the perfluoropolyether to the nonaqueous solvent may be 10% or more and 75% or less.

In the electrolytic solution of Embodiment 1, the nonaqueous solvent may contain at least one selected from the group consisting of phosphates and glyme derivatives.

In the electrolytic solution of Embodiment 1, the nonaqueous solvent may contain a phosphate family, and the phosphate family may include a compound represented by Formula (1):

(1)

where, $R_1$ to $R_3$ each independently represent an aromatic group, an unsaturated aliphatic group, or a saturated aliphatic group.

The aromatic group, the unsaturated aliphatic group, and the saturated aliphatic group may contain a halogen atom, a nitrogen atom, an oxygen atom, a sulfur atom, or a silicon atom.

The unsaturated aliphatic group and the saturated aliphatic group are straight chains or are cyclic.

The composition described above can sufficiently dissolve an alkali metal, has a high ionic conductivity, and also can provide an electrolytic solution having excellent resistance to oxidation. Consequently, the composition can contribute to the charging and discharging reaction of an active material that can provide a high voltage of a 4-V level.

As described above, in Embodiment 1, a phosphate, which is an aprotic solvent, can be used.

The phosphate solvent has a P=O double bond composed of a phosphorus atom P and an oxygen atom O and having a large bond dipole moment. Accordingly, the phosphate solvent can strongly interacts with an alkali metal cation and can dissolve the alkali metal salt.

The substituents $R_1$ to $R_3$ in Formula (1) may be saturated aliphatic groups. In such a case, all the atoms binding to carbon atoms may be hydrogen atoms or may be selected from hydrogen atoms and fluorine atoms. Such a structure is excellent in electrochemical stability and in the strength of interaction with an alkali metal cation.

In the electrolytic solution of Embodiment 1, the substituents $R_1$ to $R_3$ may be trifluoroethyl groups.

As described above, the fluorine-containing solvent can contribute to the charging and discharging reaction of an active material that can provide a high voltage.

The fluorine-containing polar solvent can have improved affinity with a perfluoropolyether molecule. Consequently, the influence on energy stabilization due to uniform compatibility can be enhanced.

In the electrolytic solution of Embodiment 1, the nonaqueous solvent may contain the phosphate in a range of 3.95 mol or more and 4.05 mol or less based on 1 mol of the alkali metal salt.

In the composition described above, the nonaqueous electrolytic solution containing the alkali metal salt and the phosphate at the above-mentioned ratio can maintain the high solubility for the alkali metal salt.

In the electrolytic solution of Embodiment 1, the nonaqueous solvent may contain a glyme derivative family, and the glyme derivative family may include a compound represented by Formula (2):

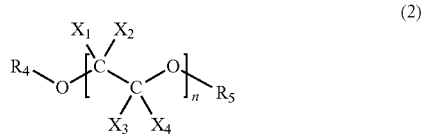

(2)

where, $R_4$ and $R_5$ each independently represent an aromatic group, an unsaturated aliphatic group, or a saturated aliphatic group.

The aromatic group, the unsaturated aliphatic group, and the saturated aliphatic group may contain a halogen atom, a nitrogen atom, an oxygen atom, a sulfur atom, or a silicon atom.

The unsaturated aliphatic group and the saturated aliphatic group may be straight chains or may be cyclic.

In Formula (2), $X_1$ to $X_4$ may each independently represent a hydrogen atom or a halogen atom.

In Formula (2), n may be an integer of 1 to 5.

The composition described above can sufficiently dissolve an alkali metal, has a high ionic conductivity, and also can provide an electrolytic solution having excellent resistance to oxidation. Consequently, the composition can contribute to the charging and discharging reaction of an active material that can provide a high voltage of a 4-V level.

As described above, in Embodiment 1, glyme derivatives, which are glycol diethers and aprotic solvents, can be used.

The glyme derivative contains a large number of C—O bonds composed of carbon C and oxygen O and having a large bond dipole moment. Since the barrier of rotation of the bond is small, the glyme derivative can have a variety of conformations. Therefore, the glyme derivative strongly interacts with (i.e., coordinates to) an alkali metal cation to dissolve the alkali metal salt and further sufficiently reduce the surface charge density of the alkali metal cation.

All the substituents $X_1$ to $X_4$ in Formula (2) may be hydrogen atoms or may be selected from hydrogen atoms and fluorine atoms. Such a structure is excellent in electrochemical stability and in the strength of interaction with an alkali metal cation.

$R_4$ and $R_5$ in Formula (2) may be each independently a saturated aliphatic group or an aromatic group.

The saturated aliphatic group may be an alkyl group or a partially fluorinated alkyl group. The aromatic group may be a phenyl group or a partially fluorinated phenyl group. Such a structure is excellent in electrochemical stability and in the strength of interaction with an alkali metal cation.

An increase in the number of the carbon atoms of the alkyl group causes steric hindrance in the interaction with an alkali metal cation. Consequently, a smaller number of carbon atoms is preferred. For example, the number of carbon atoms is preferably 4 or less.

In Formula (2), n represents the number of the ethylene oxide repeating unit and is preferably 1 to 5, more preferably 1 to 4, and most preferably 1. When n is 1, the compound represented by Formula (2) has a small molecular structure and therefore has a low viscosity. Consequently, the compound can rapidly diffuse in the nonaqueous electrolytic solution, while strongly interacting with the alkali metal cation.

As described above, in the electrolytic solution of Embodiment 1, n in Formula (2) may be 1; $X_1$ to $X_4$ in Formula (2) may be hydrogen atoms; and $R_4$ and $R_5$ in Formula (2) may be trifluoroethyl groups.

The composition described above can contain fluorine. Such a composition can contribute to the charging and discharging reaction of an active material that can provide a high voltage.

The fluorine-containing polar solvent can have improved affinity with a perfluoropolyether molecule. Consequently, the influence on energy stabilization due to uniform compatibility can be enhanced.

In the electrolytic solution of Embodiment 1, the nonaqueous solvent may contain a glyme derivative represented by Formula (2) in which n is 1, in a range of 1.95 mol or more and 2.05 mol or less based on 1 mol of the alkali metal salt.

In the composition described above, the nonaqueous electrolytic solution containing the alkali metal salt and the glyme derivative at the above-mentioned ratio can maintain the high solubility for the alkali metal salt.

For example, the alkali metal salt of Embodiment 1 may be represented by a formula "MX". The "M" of the alkali metal salt "MX" may be an alkali metal. The "X" of the alkali metal salt "MX" may be Cl, Br, I, $BF_4$, $PF_6$, $CF_3SO_3$, $ClO_4$, $CF_3CO_2$, $AsF_6$, $SbF_6$, $AlCl_4$, $N(CF_3SO_2)_2$, $N(FSO_2)_2$, $N(CF_3CF_2SO_2)_2$, or $N(CF_3SO_2)(FSO_2)$. The "X" of the alkali metal salt "MX" is preferably BF4, $PF_6$, $ClO_4$, $N(CF_3SO_2)_2$, or $N(CF_3CF_2SO_2)_2$ from the viewpoint of chemical stability, and is preferably $N(CF_3SO_2)_2$, $N(FSO_2)_2$, $N(CF_3CF_2SO_2)_2$, or $N(CF_3SO_2)(FSO_2)$ from the viewpoint of solubility. These alkali metal salts may be used alone or as a mixture of two or more thereof.

That is, the anion contained in the electrolytic solution of Embodiment 1 may be at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2-CF_2CF_2SO_2-)^-$, and $[N-(SO_2F)-(SO_2CF_3)]^-$.

The composition described above can have improved solubility for an alkali metal salt and also can provide an electrolytic solution having a high ionic conductivity.

In the electrolytic solution of Embodiment 1, the alkali metal cation may be a lithium ion or a sodium ion.

Embodiment 2

Embodiment 2 will now be described, but the explanation duplicated with Embodiment 1 is appropriately omitted.

The battery in Embodiment 2 includes the electrolytic solution of Embodiment 1, a positive electrode, and a negative electrode.

The positive electrode contains a positive electrode active material that has a property of occluding and releasing (i.e., can occlude and release) one or more alkali metal cations.

The negative electrode contains a negative electrode active material that has a property of occluding and releasing (i.e., can occlude and release) one or more alkali metal cations.

Such a configuration can provide a battery achieving a high voltage and having a high energy density.

The battery of Embodiment 2 can be constituted, for example, as a secondary battery.

FIGURE is a schematic cross-sectional view illustrating an example of the battery according to Embodiment 2.

The battery shown in FIGURE includes a positive electrode 13, a negative electrode 16, a separator 17, and an outer package 18.

The positive electrode 13 is composed of a positive electrode collector 11 and a positive electrode mixture layer 12 disposed on the positive electrode collector 11.

The negative electrode 16 is composed of a negative electrode collector 14 and a negative electrode mixture layer 15 disposed on the negative electrode collector 14.

The positive electrode 13 and the negative electrode 16 face each other with the separator 17 therebetween.

The positive electrode 13, the negative electrode 16, and the separator 17 are covered with the outer package 18 to form a battery.

The positive electrode mixture layer 12 may contain a positive electrode active material that can occlude and release alkali metal ions.

Examples of the positive electrode active material will now be described.

When the alkali metal is lithium, the positive electrode active material can be a known material that can occlude and release lithium ions. Examples of the positive electrode active material include transition metal oxides and lithium-containing transition metal oxides, for example, oxides of cobalt, oxides of nickel, oxides of manganese, oxides of vanadium such as vanadium pentoxide ($V_2O_5$), and mixtures or complex oxides thereof; complex oxides containing lithium and transition metals, such as lithium cobaltate ($LiCoO_2$); and silicates of transition metals and phosphates of transition metals such as lithium iron phosphate ($LiFePO_4$).

When the alkali metal is sodium, the positive electrode active material can be a known material that can occlude and release sodium ions. Examples of the positive electrode active material include transition metal oxides and sodium-containing transition metal oxides, for example, oxides of cobalt, oxides of nickel, oxides of manganese, oxides of vanadium such as vanadium pentoxide ($V_2O_5$), and mixtures or complex oxides thereof; complex oxides containing sodium and transition metals, such as sodium manganate ($NaMnO_2$); and silicates of transition metals and phosphates of transition metals.

The positive electrode collector 11 can be a porous or non-porous sheet or film made of a metal material, such as aluminum, stainless steel, titanium, or an alloy thereof. Aluminum and alloys thereof are inexpensive and can be readily formed into a thin film. The sheet or film can be, for example, metal foil or mesh. The surface of the positive electrode collector 11 may be coated with a carbon material, such as carbon, for reducing the resistance value, providing a catalytic effect, and enhancing the binding between the positive electrode mixture layer 12 and the positive electrode collector 11.

The negative electrode mixture layer 15 may contain a negative electrode active material that can occlude and release alkali metal ions.

Examples of the negative electrode active material will now be described.

When the alkali metal is lithium, the negative electrode active material can be a known material that can occlude and release lithium ions. Examples of the negative electrode active material include lithium metal element, lithium metal alloys, carbon materials, and metal oxides. Examples of carbon material include graphite and non-graphite carbon materials, such as hard carbon and coke. Examples of the metal oxide include lithium titanate represented by $Li_4Ti_5O_{12}$. Examples of the lithium metal alloy include alloys of lithium with a silicon compound, tin compound, or aluminum compound.

When the alkali metal is sodium, the negative electrode active material can be a known material that can occlude and release sodium ions. Examples of the negative electrode active material include sodium metal element, sodium metal alloys, carbon materials, and metal oxides. Examples of carbon material include graphite and non-graphite carbon materials, such as hard carbon and coke. Examples of the metal oxide include sodium titanate represented by $Na_2Ti_3O_7$. Examples of the sodium metal alloy include alloys of sodium with a tin compound, germanium compound, zinc compound, bismuth compound, or indium compound.

The negative electrode collector 14 can be a porous or non-porous sheet or film made of a metal material, such as aluminum, stainless steel, nickel, copper, or an alloy thereof. Aluminum and alloys thereof are inexpensive and can be readily formed into a thin film. The sheet or film can be, for example, metal foil or mesh. The surface of the negative electrode collector 14 may be coated with a carbon material, such as carbon, for reducing the resistance value, providing a catalytic effect, and enhancing the binding between the negative electrode mixture layer 15 and the negative electrode collector 14.

The positive electrode mixture layer 12 may contain a conductive assistant, an ion conductor, a binder, or another component.

The negative electrode mixture layer 15 may contain a conductive assistant, an ion conductor, a binder, or another component.

The conductive assistant can be used for reducing the electrode resistance. Examples of the conductive assistant include carbon materials, such as carbon black, graphite, and acetylene black; and conductive polymers, such as polyaniline, polypyrrole, and polythiophene.

The ion conductor can be used for reducing the electrode resistance. Examples of the ion conductor include gel electrolytes, such as polymethyl methacrylate; and solid electrolytes, such as polyethylene oxide.

The binder is used for improving the binding properties of the material constituting the electrode. Examples of the binder include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene copolymer rubber, polypropylene, polyethylene, and polyimide.

The separator 17 can be a porous film made of, for example, polyethylene, polypropylene, glass, cellulose, or ceramic. The porous film can be used by filling the pores with an electrolyte.

EXAMPLES

Examples and Comparative Examples will describe nonaqueous electrolytic solutions as an aspect of the present disclosure, nonaqueous electrolyte secondary batteries produced using the nonaqueous electrolytic solutions, and the results thereof.

The nonaqueous electrolytic solutions in Examples were all prepared in an argon glove box.

The composition of the present disclosure is not limited to the following Examples.

Example 1

Nonaqueous electrolytic solutions were prepared using the following perfluoropolyether, phosphate solvent, and alkali metal salt.

That is, the perfluoropolyether used was a perfluoropolyether (manufactured by Solvay Specialty Polymers, L10) represented by Formula (3): R—O—($C_\alpha F_{2\alpha}$—O—)$_p$—($C_\beta F_{2\beta}$—O—)$_q$—R, where α was 3; β was 1; each R was a carboxylate represented by $CF_2$—COO—$C_x H_{2x+1}$ (herein, x is 2); and p and q representing the numbers of repeating units were 5 to 7 when estimated from the weight-average molecular weight by assuming the values p and q were the same.

The phosphate solvent was a fluorinated phosphate (TFEP) represented by Formula (1):

$$\begin{array}{c} O \\ \| \\ R_3O-P-OR_1 \\ | \\ OR_2 \end{array} \quad (1)$$

where the substituents $R_1$ to $R_3$ are trifluoroethyl ($CF_3$—$CH_2$—) groups.

The alkali metal salt used was lithium bis(fluorosulfonyl) imide ($LiN(FSO_2)_2$).

The phosphate and the alkali metal salt were mixed at a molar ratio of 4:1 to dissolve the alkali metal salt in the phosphate.

Subsequently, the perfluoropolyether was mixed with the phosphate at a volume proportion of the perfluoropolyether to the total volume (total volume of the solvents) of 75%.

Nonaqueous electrolytic solution sample 1 was thus prepared.

Nonaqueous electrolytic solution sample 1 had a Li ion concentration of 0.27 M.

Example 2

A perfluoropolyether having methyl ether groups at both molecular ends was synthesized in accordance with the following scheme shown in Formula (4):

$$\text{HO-CH}_2\text{-CF}_2\text{-(O-CF}_2\text{-CF}_2\text{)}_p\text{-(O-CF}_2\text{)}_q\text{-O-CF}_2\text{-CH}_2\text{-OH} \xrightarrow[\text{THF}]{\text{NaH, CH}_3\text{I}} \quad (4)$$

$$\text{CH}_3\text{-O-CH}_2\text{-CF}_2\text{-(O-CF}_2\text{-CF}_2\text{)}_p\text{-(O-CF}_2\text{)}_q\text{-O-CF}_2\text{-CH}_2\text{-O-CH}_3$$

That is, sodium hydride and methyl iodide were mixed with fluorinated diol (manufactured by Solvay Specialty Polymers, D10) in dehydrated tetrahydrofuran to prepare a perfluoropolyether having methyl ether groups at both molecular ends.

The resulting perfluoropolyether was a perfluoropolyether represented by Formula (3), where α was 2; β was 1; and p and q representing the numbers of repeating units were 1 to 3 when estimated from the weight-average molecular weight by assuming the values p and q were the same.

The perfluoropolyether was mixed with the same phosphate as that in Example 1 at a volume proportion of the perfluoropolyether to the total volume (total volume of the solvents) of 10%.

Nonaqueous electrolytic solution sample 2 was prepared as in Example 1 except the above.

Nonaqueous electrolytic solution sample 2 had a Li ion concentration of 0.96 M.

Example 3

The same perfluoropolyether as that in Example 2 was mixed with the same phosphate as that in Example 2 at a volume proportion of the perfluoropolyether to the total volume (total volume of the solvents) of 75%.

Nonaqueous electrolytic solution sample 3 was prepared as in Example 2 except the above.

Nonaqueous electrolytic solution sample 3 had a Li ion concentration of 0.27 M.

Example 4

Nonaqueous electrolytic solutions were prepared using the following perfluoropolyether, glyme derivative, and alkali metal salt.

That is, the same perfluoropolyether as that in Example 2 was used.

The glyme derivative was a compound (FDEE) represented by Formula (2):

$$R_4-O-\left(\begin{array}{c} X_1 \; X_2 \\ | \; | \\ C \\ | \; | \\ C \\ | \; | \\ X_3 \; X_4 \end{array}\right)_n -O-R_5 \quad (2)$$

where, n is 1; substituents $R_4$ and $R_5$ are trifluoroethyl ($CF_3$—$CH_2$—) groups; and $X_1$ to $X_4$ are hydrogen atoms.

The alkali metal salt used was lithium bis(trifluoromethylsulfonyl)imide ($LiN(CF_3SO_2)_2$).

The glyme derivative and the alkali metal salt were mixed at a molar ratio of 2:1 to dissolve the alkali metal salt in the glyme derivative.

Subsequently, the same perfluoropolyether as that in Example 2 was mixed with the glyme derivative at a volume proportion of the perfluoropolyether to the total volume (total volume of the solvents) of 75%.

Nonaqueous electrolytic solution sample 4 was thus prepared.

Nonaqueous electrolytic solution sample 4 had a Li ion concentration of 0.63 M.

Comparative Example 1

The perfluoropolyether used was a perfluoropolyether (manufactured by Solvay Specialty Polymers, Galden HT-80) having unfunctionalized molecular ends and having a weight-average molecular weight of 430.

Nonaqueous electrolytic solution sample 5 was prepared as in Example 2 except the above.

Comparative Example 2

The perfluoropolyether used was a perfluoropolyether (manufactured by Solvay Specialty Polymers, Galden HT-170) having unfunctionalized molecular ends and having a weight-average molecular weight of 760.

Nonaqueous electrolytic solution sample 6 was prepared as in Example 2 except the above.

Comparative Example 3

The perfluoropolyether used was a perfluoropolyether (manufactured by Solvay Specialty Polymers, Galden HT-230) having unfunctionalized molecular ends and having a weight-average molecular weight of 1020.

Nonaqueous electrolytic solution sample 7 was prepared as in Example 2 except the above.

[Evaluation of Compatibility and Conductivity]

The nonaqueous electrolytic solutions of Examples 1 to 4 and Comparative Examples 1 to 3 were visually evaluated for compatibility. The nonaqueous solvents judged to be uniform were measured for the conductivity. The conductivity was measured at 25° C.

Table shows the results of evaluation of the compatibility and the conductivity of the nonaqueous electrolytic solutions of Examples 1 to 4 and Comparative Examples 1 to 3.

In Table, "compatibility: ×" means that deposition of the alkali metal salt or phase separation of the solvents was observed.

In Table, "compatibility: O" means that no deposition of the alkali metal salt or no phase separation of the solvents was observed.

The results shown in Table demonstrate that the nonaqueous electrolytic solutions of Examples 1 to 4 each containing an alkali metal salt and a perfluoropolyether having an unfluorinated ester or ether group at each molecular end were prepared as uniform solvents that did not cause phase separation of the solvents and did not cause deposition of the alkali metal salt.

The nonaqueous electrolytic solutions each containing a perfluoropolyether of which each molecular end is functionalized with an unfluorinated ester or ether group were uniform solutions in a broad composition range, i.e., in a volume proportion range of the perfluoropolyether of 10% to 75%.

In contrast, the nonaqueous electrolytic solutions of Comparative Examples 1 to 3 each containing a perfluoropolyether of which each molecular end is not functionalized (i.e., the molecular ends are fluoroalkyl groups) were not uniform solutions, and phase separation was observed.

It was accordingly demonstrated that the functional groups introduced to the molecular ends work for dissolving an alkali metal salt and for preparing a uniform solution.

Functionalization of the molecular ends can enhance the compatibility even if the concentration of an alkali metal salt in a solvent mixture is high.

Example 5

Example 5 relates to a lithium secondary battery containing a nonaqueous electrolytic solution.

The positive electrode active material was $LiNiCoAlO_2$.

The positive electrode active material, acetylene black as a conductive assistant, and polyvinylidene fluoride as a binder were weighed at a weight ratio of 8:1:1, and the mixture was dispersed in an NMP solvent to prepare a slurry.

The resulting slurry was applied to an Al collector with a coater.

The electrode plate coated with the slurry was rolled with a rolling mill, was punched into a 20 mm square, and was processed into an electrode state to prepare a positive electrode.

A negative electrode was produced by pressure-bonding lithium metal to a 20 mm square nickel mesh.

The positive electrode and the negative electrode were disposed so as to face each other with a polyethylene

TABLE

|  | Molecular end structure of perfluoropolyether | Solvent | Volume proportion of perfluoropolyether [%] | Evaluation results of compatibility | Conductivity [$10^{-6}$ S/cm] |
|---|---|---|---|---|---|
| Example 1 | Ethyl ester | Fluorinated phosphate | 75 | o | 33 |
| Example 2 | Methyl ether | | 10 | o | 724 |
| Example 3 | | | 75 | o | 21 |
| Example 4 | | Glyme derivative | 75 | o | 4.7 |
| Comparative Example 1 | Trifluoromethyl | Fluorinated phosphate | 10 | x | — |
| Comparative Example 2 | | | 10 | x | — |
| Comparative Example 3 | | | 10 | x | — | microporous film as the separator therebetween to produce an electrode group having a configuration described in Embodiment 2.

Nonaqueous electrolytic solution sample 1 of Example 1 was used as the electrolytic solution.

The electrolytic solution was poured to the electrode group, and sealing was performed to produce a laminated lithium secondary battery.

[Charging and Discharging Test]

The lithium secondary battery of Example 5 was subjected to a charging and discharging test under the following conditions.

The charging and discharging test was performed in a thermostatic chamber of 25° C.

In the test, charging was first performed, and the battery was paused for 30 minutes, followed by discharging. This charging and discharging process was repeated three times.

The charging was performed at a constant current and a constant voltage with a current of 0.05 C rate with respect to the theoretical capacity of the positive electrode active material. The upper limit charging voltage was 4.3 V. The lower limit current value at the constant voltage was 0.02 C rate.

The discharging was performed at a lower limit discharging voltage of 2.5 V and a current of 0.05 C rate.

The charging and discharging operation was repeated three times. On this occasion, stable charging and discharging operation was confirmed. After the confirmation, the discharging capacity on the third discharging operation was converted into the capacity per 1 g of the positive electrode active material (mAhg$^{-1}$).

The electrolytic solutions of Comparative Examples 1 to 3 caused phase separation and could not be subjected to the charging and discharging test.

In contrast, the battery of Example 5 had a discharging capacity of 154 mAhg$^{-1}$.

The results demonstrate that the electrolytic solution of Example 5 had sufficient electrochemical stability capable of withstanding charging and discharging operation of the battery, in spite of a large amount (a volume proportion of 75%) of the perfluoropolyether solvent, which is a flame retardant, contained in the electrolytic solution.

The electrolytic solution of the present disclosure can be used as the electrolytic solution of a battery.

What is claimed is:

1. An electrolytic solution comprising:
   a nonaqueous solvent; and
   an alkali metal salt, wherein
   the alkali metal salt is dissolved in the nonaqueous solvent;
   the nonaqueous solvent contains a perfluoropolyether;
   the molecular ends of the perfluoropolyether are each an unsubstituted alkyl ether or an unsubstituted carboxylate; and
   the perfluoropolyether includes a repeating unit composed of a perfluoroalkyl chain and an oxygen atom.

2. The electrolytic solution according to claim 1, wherein the perfluoropolyether is a compound represented by Formula (3): R—O—(C$_\alpha$F$_{2\alpha}$—O—)$_p$—(C$_\beta$F$_{2\beta}$—O—)$_q$—R, where
   Rs each independently represent a carboxylate represented by CF$_2$—COO—C$_x$H$_{2x+1}$ or an alkyl ether represented by CH$_2$—O—C$_x$H$_{2x+1}$;
   $\alpha$ and $\beta$ each independently represent an integer of 1 to 3; and
   p and q represent the numbers of repeating units and each independently represent an integer of 1 to 20.

3. The electrolytic solution according to claim 2, wherein each R represents a carboxylate represented by CF$_2$—COO—C$_x$H$_{2x+1}$;
   x is 2;
   $\alpha$ is 3; and
   $\beta$ is 1.

4. The electrolytic solution according to claim 2, wherein each R represents an alkyl ether represented by CH$_2$—O—C$_x$H$_{2x+1}$;
   x is 1;
   $\alpha$ is 3; and
   $\beta$ is 1.

5. The electrolytic solution according to claim 1, wherein the nonaqueous solvent contains the perfluoropolyether at a volume proportion of the perfluoropolyether to the nonaqueous solvent of 10% or more and 75% or less.

6. The electrolytic solution according to claim 1, wherein the nonaqueous solvent contains at least one selected from the group consisting of phosphates and glyme derivatives.

7. The electrolytic solution according to claim 6, wherein the nonaqueous solvent contains a phosphate family; and the phosphate family includes a compound represented by Formula (1):

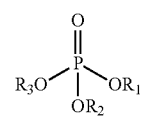

(1)

where, R$_1$ to R$_3$ each independently represent an aromatic group, an unsaturated aliphatic group, or a saturated aliphatic group, wherein
the aromatic group, the unsaturated aliphatic group, and the saturated aliphatic group contain a halogen atom, a nitrogen atom, an oxygen atom, a sulfur atom, or a silicon atom; and
the unsaturated aliphatic group and the saturated aliphatic group are straight chains or are cyclic.

8. The electrolytic solution according to claim 7, wherein R$_1$ to R$_3$ represent trifluoroethyl groups.

9. The electrolytic solution according to claim 8, wherein the nonaqueous solvent contains the phosphate in a range of 3.95 mol or more and 4.05 mol or less based on 1 mol of the alkali metal salt.

10. The electrolytic solution according to claim 6, wherein
the nonaqueous solvent contains a glyme derivative family; and
the glyme derivative family includes a compound represented by Formula (2):

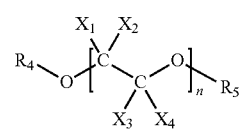

(2)

where, R$_4$ and R$_5$ each independently represent an aromatic group, an unsaturated aliphatic group, or a saturated aliphatic group, wherein the aromatic group, the unsaturated aliphatic group, and the saturated aliphatic group contain a halogen atom, a nitrogen atom, an oxygen atom, a sulfur atom, or a silicon atom;

the unsaturated aliphatic group and the saturated aliphatic group are straight chains or are cyclic;

$X_1$ to $X_4$ each independently represent a hydrogen atom or a halogen atom; and n represents an integer of 1 to 5.

11. The electrolytic solution according to claim 10, wherein in Formula (2), n is 1;

$X_1$ to $X_4$ are hydrogen atoms; and $R_4$ and $R_5$ are trifluoroethyl groups.

12. The electrolytic solution according to claim 11, wherein the nonaqueous solvent contains a glyme derivative represented by Formula (2) in which n is 1, in a range of 1.95 mol or more and 2.05 mol or less based on 1 mol of the alkali metal salt.

13. The electrolytic solution according to claim 1, wherein the alkali metal salt is composed of an alkali metal cation and an anion; and the anion is at least one selected from the group consisting of $BF_4^-$, $PF_6^-$, $N(SO_2CF_3)_2^-$, $N(SO_2F)_2^-$, $N(SO_2CF_2CF_3)_2^-$, $N(SO_2\text{—}CF_2CF_2SO_2\text{—})^-$, and $[N\text{—}(SO_2F)\text{—}(SO_2CF_3)]^-$.

14. The electrolytic solution according to claim 1, wherein the alkali metal salt is composed of an alkali metal cation and an anion; and the alkali metal cation is a lithium ion or a sodium ion.

15. A battery comprising:

an electrolytic solution;

a positive electrode containing a positive electrode active material that has a property of occluding and releasing an alkali metal cation; and a negative electrode containing a negative electrode active material that has a property of occluding and releasing the alkali metal cation, wherein the electrolytic solution contains a nonaqueous solvent and an alkali metal salt;

the alkali metal salt is composed of the alkali metal cation and an anion;

the alkali metal salt is dissolved in the nonaqueous solvent;

the nonaqueous solvent contains a perfluoropolyether;

the molecular ends of the perfluoropolyether are each an unsubstituted alkyl ether or an unsubstituted carboxylate; and the perfluoropolyether includes a repeating unit composed of a perfluoroalkyl chain and an oxygen atom.

* * * * *